United States Patent Office 3,483,167
Patented Dec. 9, 1969

3,483,167
VISCOSITY CONTROL IN THE CHAIN EXTENSION OF LINEAR POLYURETHANES USING A COMBINATION OF CHAIN EXTENDERS AND A CHAIN-STOPPER
Erwin Sommer, Obernburg, and Jost-Henrich Manegold and Helmut Schulze, Erlenbach, Germany, assignors to Glanzstoff AG, Wuppertal, Germany
No Drawing. Filed Nov. 29, 1967, Ser. No. 686,736
Claims priority, application Germany, Dec. 2, 1966, G 48,630
Int. Cl. C08g 22/04
U.S. Cl. 260—75          17 Claims

ABSTRACT OF THE DISCLOSURE

Process for improving the control and uniformity of the viscosity characteristics of substantially linear polyurethanes as normally obtained by the addition of a chain extending agent to a prepolymer of a diisocyanate and a hydroxyl-terminated polyester, polyether or the like, said process requiring the addition of critical molar amounts of a chain extending agent consisting of a mixture of (A) a difunctional compound selected from the group consisting of diamines, hydrazine and hydrazides, and (B) a dihydroxy aliphatic monoamine, with the chain extending reaction being stopped or terminated at a desired viscosity by the addition of a monohydric alcohol. The resulting polyurethanes are elastomeric polymers of known utility as films, coatings, filaments and the like distinguished by their uniformity and stability.

---

It is a known procedure to produce polyurethanes through conversion of diols with diisocyanates. For example, O. Bayer describes in Angew. Chem. 59 (9), pp. 257 to 288 (1947), the conversion of diisocyanates with low molecular weight diols, such as 1,4-butylene glycol, into polyurethanes. The use of so-called "macrodiols," such as linear polyesters with terminal hydroxy groups, for the production of polyurethanes is also taught by this reference. By means of this process, numerous polyurethanes can undoubtedly be produced which can be employed for widely different purposes. However, it is extremely difficult to obtain reproducible products with constant or uniform qualities in this manner. In particular, the production of polyurethanes with specific molecular weights and their stabilization against a repolymerization meet with severe difficulties. These problems essentially result from a failure to control or maintain a uniform viscosity.

It is furthermore known to convert macrodiols first of all with polyisocyanates into a preliminary or initial adduct, referred to as a "prepolymer," exhibiting —NCO terminal groups and to then add chain extending agents to this prepolymer. As chain extending agents, compounds are suitable which possess at least two hydrogen atoms reacting with the isocyanate groups (—NCO) in the molecule of the prepolymer. These chain extenders include: diamines such as ethylene diamine, propylene diamine, piperazine, tolylene diamine; divalent alcohols and phenols such as ethylene glycol, butanediol, hydroquinone; amino-alcohols such as ethanol amine can also be used. Likewise suitable are substances such as hydrazine, carbohydrazide and dicarboxylic acid dihydrazides.

One molecule of the difunctional chain extending agent reacts with one isocyanate terminal group of two different molecules of the prepolymer. In this manner several molecules can be joined into a chain, i.e. a chain extension occurs.

In the use of compounds with three functional groups such as, e.g. diethanol amine, glycerin, etc. a latticelike polymerization may possibly result, i.e. so as to produce crosslinked products.

It has become evident that when employing chain extending agents, the additional use of chain regulators or stabilizers is expedient. These chain regulators react as monofunctional compounds. They block terminal groups of the prepolymer or partly formed chain otherwise capable of reacting and thereby prevent to a certain extent the continuous growing of the chain beyond a specific degree of polymerization. Amines such as aniline and diethylamine are suitable among others as stabilizers. Amino-alcohols in which the amino group reacts more quickly than the hydroxy group are also used as stabilizers, as is well known. The reaction of the chain extending agent with the isocyanate groups can also be stopped or retarded through the addition of alcohols, for example, ethanol.

According to one known process for the production of polyurethanes on the basis of very special N-hydroxyalkyl-N-alkylurethane-modified polyethers, one can in addition to chain extending agents such as ethylene diamine also jointly use trifunctional compounds such as diethanol amine, in which case, however, it is a rather open question as to what quantities these trifunctional compounds are supposed to be employed.

According to still another known process which teaches the use of diethanol amine together with a chain extending agent such as ethylene diamine, the concentration of the diethanol amine is supposed to amount to less than 5 mol percent with reference to the chain extending agent being used.

One object of the invention is to provide a process for the production of substantially linear polyurethanes in which the molecular weight and polymer structure, as determined by the viscosity of the polyurethane, can be more easily regulated and controlled so as to yield a more uniform and stable product.

Another object of the invention is the production of polyurethanes which exhibit improved mechanical or physical properties after being cured or solidified as well as a greater stability in their precured or dissolved state.

Still another object of the invention is to provide an improved process for the production of polyurethanes which is generally applicable to the controlled viscosity increase of the prepolymer of an aromatic diisocyanate with linear diols whereby one can achieve a wider variety of uniform polyurethane products.

These and other objects and advantages of the process according to the invention will become more apparent upon consideration of the following detailed disclosure.

It has now been found, in accordance with the present invention, that the regulation or control of uniform viscosity and other properties of polyurethanes can be highly improved if a prepolymer having terminal isocyanate groups and formed by reacting (1) an aromatic di-isocyanate with (2) a substantially linear macrodiol having a molecular weight of about 500 to 6,000, preferably 800 to 2,500, and if desired up to 50 mol percent, with reference to the total mols of diol, of a lower molecular weight aliphatic diol, is subjected to a chain extending reaction accompanied by increasing viscosity, the desired control of viscosity in this chain extending reaction being achieved by the addition to the prepolymer as a chain extending agent a mixture of (A) 0.15 to 0.85 mol per mol of prepolymer of at least one difunctional chain extender selected from the class consisting of diamines, hydrazine and hydrazides, and
(B) 0.1 to 0.8 mol per mol of prepolymer of a dihydroxy aliphatic monoamine, with the proviso that the sum of the mols of components (A) and (B) is less than the total mols of said prepolymer, and by stopping the chain extending reaction at the point of reaching the desired viscosity by the addition of a monohydric alcohol. In general, the preparation of the prepolymer is conventional and, aside from the critical amounts of the components (A) and (B), the chain extending reaction can also be carried out under conventional conditions.

In general, the mixture of (A) and (B) as the chain extending agent should be added in an amount of at least 0.45 mol (A+B) per mol of prepolymer and preferably a total of about 0.75 to 0.95 mol (A+B) per mol of prepolymer. The molar ratio of the diamine type component (A) to the dihydroxy amine component (B) can vary rather widely, e.g. 10:1 to 1:2, but especially satisfactory results of technical importance are achieved by using a molar ratio of (A):(B) of about 8:1 to 3:1. The resulting polyurethanes then exhibit especially good mechanical and physical properties.

By comparison, if one works outside the prescribed range of molar amounts per mol of prepolymer of the two components employed as a chain extending agent, it is extremely difficult if not impossible to exercise any control over the viscosity of the resulting polyurethane. For example, if one prepares a prepolymer of an aromatic diisocyanate with a macrodiol such as a hydroxy-terminated polyester and then attempts to extend the chain by addition of any conventional diamine and a dihydroxy monoamine such as diethanol amine in molar amounts of each component outside of the range according to the invention, practically no control or adjustment of the viscosity, i.e. the final molecular weight, is possible. When adding a monohydric alcohol such as ethanol in order to stop the chain extension at any particular point of time, the viscosity begins to increase again soon after the addition of the alcohol. Of course, unsatisfactory results also occur if either of the two essential components (A) or (B) are completely omitted.

On the other hand, if the additive quantities of components (A) and (B) are selected within the scope of the invention, it is surprisingly possible to stop the chain extending reaction at almost any point of time and to maintain a specifically desired viscosity at a substantially constant value over a prolonged period of time. Thus, rather than accepting only those polyurethanes which inherently result from the uncontrolled chain extension of the prior art, it is now possible, simply by selecting an appropriate point of time for the addition of the alcohol as a chain stopping agent, to control and even preselect any desired viscosity of the polyurethane product. This is especially advantageous because the other conditions for preparing the prepolymer and extending the chain length can remain the same, thereby permitting a much wider variety of products having a controlled and relatively stable viscosity. Since the initial materials or reactants can vary somewhat in their properties or characteristics, this control and stability of the viscosity serves to permit the production of more uniform and commercially acceptable polyurethanes which are easier to handle and which yield more predictable results in all technical applications of these generally known polymers.

The term "macrodiols" has been employed herein as a definition of all of the conventional difunctional hydroxyl-terminated linear polymeric substances normally used in the production of polyurethanes. These macrodiols should ordinarily have a moderately high molecular weight, usually more than 500 and preferably about 800 to 2,500, although it is feasible to employ suitable diols with higher molecular weights up to about 6,000. These macrodiols include such well known substances as polyesters, copolyesters, polyethers, copolyethers, polylactones such as polycaprolactone, and polyester amides. In addition, it is possible to employ modified macrodiols which are produced for example, by reacting 1 mol of a suitable diisocyanate, preferably an aromatic diisocyanate, with 2 mols of the macrodiol.

The preparation of the macrodiols suitable for use in producing polyurethanes is described in considerable detail in such literature references as "High Polymers, vol. XVI; Polyurethanes: Chemistry and Technology, Part I" by Saunders and Frisch, Interscience Publishers (1962), especially pages 32–48, including other references cited therein and listed on pages 54–61.

In general, the polyesters are prepared by linear condensation of at least one glycol with one or more organic dicarboxylic acids, the term "copolyester" being applicable where the glycol and/or the dicarboxylic acid component is made up of a mixture of at least two different compounds. The condensation is carried out in a conventional manner to provide a linear polymer having the desired molecular weight and having a linear chain terminated by the required hydroxy groups. The glycols are usually those of about 2 to 8 carbon atoms, preferably 2 to 6 carbon atoms, e.g. ethylene glycol, propylene glycol, butylene glycol, 1,6-hexane-diol and the like. The dicarboxylic acids are likewise those commonly used in this art, i.e. aliphatic, cycloaliphatic and aromatic dicarboxylic acids and preferably those dibasic acids having about 6 to 10 carbon atoms. Adipic acid is especially preferred for the subsequent production of elastomeric polyurethanes from the intermediate polyester.

The polyesteramides are likewise prepared in a known manner by linear polycondensation, using the same glycols and dicarboxylic acids as the polyesters but including small amounts of difunctional amines, e.g. diamines, amino alcohols or aminocarboxylic acids.

The preparation of polylactones as a suitable macrodiol in the production of polyurethanes is described in such references as U.S. 2,933,477 and U.S. 2,933,478.

The polyethers represent a large class of suitable macrodiols which are easily prepared by a number of different methods. These polyethers are sometimes referred to as "polyether polyols" or "polyalkylene ether glycols," the latter term being preferred herein to designate those polyethers which are essentially linear polymers with two terminal hydroxy groups. The alkylene portion of the chain may have from 2 to about 10 carbon atoms, preferably 2 to 4 carbon atoms. Polytetramethylene glycol, often called poly(oxytetramethylene) glycol, can be prepared by the polymerization of tetrahydrofuran, and is especially useful in the production of elastomeric polyurethanes. However, many polyethers are commercially available in the form of polyoxyalkylated compounds, especially the polyoxyalkylated dihydric alcohols, i.e. a glycol which has been reacted with an epoxide so as to produce a macrodiol of the required molecular weight.

In preparing the initial adduct or prepolymer, one can use individual macrodiols or mixtures of more than one macrodiol. Furthermore, it is possible to use such macrodiols in admixture with up to 50 mol percent, with reference to the total number of mols of diol, of a low molecular weight aliphatic or cycloaliphatic diol, e.g. ethylene glycol, diethylene glycol, 1,4-butane-diol, 1,6-hexane-diol, 1,4-cyclohexane-diol, and the like, which generally exhibit a molecular weight below about 150. It has been found that 1,4-butane-diol is especially useful as such a lower molecular weight diol.

The preparation of the prepolymer proceeds in a conventional manner by reacting the macrodiol and 0 to 50 mol percent of the lower molecular weight diol with a suitable aromatic diisocyanate so as to yield the isocyanate terminated intermediate which is the usual chain-extendable prepolymer. Among the aromatic diisocyanates, there may be used such compounds as phenylene diisocyanate, naphthalene diisocyanate and especially 4,4' - diphenylmethane diisocyanate. The 2,4- and 2,6-tolylene diisocyanates and especially their commercial mixtures are also suitable. Other aromatic diisocyanates include: 3,3'-dimethyl - 4,4'-biphenyl diisocyanate; m-xylylene diisocyanate; 3,3'-dimethyl-diphenylmethane-4,4'-diisocyanate.

As the diamine chain-extending component (A) any of the compounds cited in the literature of this art can be employed. In general, these chain extenders are characterized as compounds containing two functional primary amino groups (—$NH_2$) and otherwise being free of reactive hydrogen atoms or any other functional groups. Suitable diamines include aliphatic, cycloaliphatic and araliphatic diamines including ethylene diamine, 1,3-diaminopropane, m-xylylene diamine and the like. The lower alkylene diamines and especially ethylene diamine have given particularly good results. However, one can also use aliphatic diamines which contain an inert nitrogen atom or similar hetero atom or group in the molecule, e.g. compounds with a tertiary nitrogen atom such as bis-(3-aminopropyl)-methylamine. The various diamines may be used individually or as mixtures. Other difunctional compounds having two —$NH_2$ groups which are generally equivalent to the diamines as chain extenders are hydrazine and hydrazine derivatives such as carbohydrazide and dicarboxylic acid dihydrazides. In general, therefore, the chain extending component (A) may be represented by the formula $H_2N$—$(R)_n$—$NH_2$ wherein R represents a divalent, functionally inert aliphatic, cycloaliphatic or araliphatic bridge of preferably 2 to 10 carbon atoms and $n$ is 0 or 1.

As the dihydroxy aliphatic monoamine, it is preferable to employ diisopropanol amine and especially diethanol amine. In general, these compounds can be identified as bis-(hydroxyalkylene)-amines in which the alkylene contains not more than 6 carbon atoms and preferably 2 to 4 carbon atoms. Other suitable compounds include: bis-($\delta$-hydroxybutyl)-amine and bis-($\beta$-hydroxyhexyl)-amine.

It has been found to be advantageous to react the mixture of (A) and (B) as the chain extending agent with the prepolymer at approximately room temperature or somewhat higher temperatures, i.e. moderately elevated temperatures up to about 65° C. The chain extending reaction for purposes of the present invention is preferably carried out at about 20° C. to 50° C.

In order to stop the chain extending reaction at a particular point, i.e. so as to limit the viscosity or molecular weight of the resulting polyurethane, there is added a monohydric alcohol, e.g. a lower alkanol and especially methanol or ethanol. The amount of the added monohydric alcohol may be varied, depending upon the extent to which the chain extension reaction has been carried out or the point at which the chain extension is to be completed. In general, however, it is desirable to add the monohydric alcohol in an amount sufficient to completely react any residual or still unreacted terminal isocyanate groups of the prepolymer, and for most purposes one can use about 2 to 10 mols of the monohydric alcohol per mol of the initial prepolymer. An excess of the monohydric alcohol is not harmful.

The production of the polyurethane according to the process of the invention proceeds essentially as follows: First, one prepares the prepolymer by employing one or more of the conventional macrodiols which may contain up to 50 mol percent of a lower molecular weight diol and reacting the diol or diol mixture with the aromatic diisocyanate. The diisocyanate can be added to the diol reactant by itself or preferably in a suitable inert organic solvent, usually at an elevated temperature of approximately 60° C. to 100° C., in a quantity sufficient to ensure the production of a prepolymer having terminal isocyanate groups. The mixture of the diisocyanate and diol is maintained at said elevated temperature for a period of time sufficient to form the prepolymer, usually about one-half to one hour, and the reaction product is then mixed with an inert solvent such as dimethyl formamide. The quantity of the added solvent, which is preferably selected from any of the known solvents for polyurethanes and their prepolymers, depends upon the desired concentration of solids corresponding to the prepolymer product which usually lies between about 15 and 40% by weight after dilution with the solvent. While the production of the prepolymer in the process of the present invention follows conventional procedures, it is an advantage that one can often use higher concentrations of the prepolymer in an inert solvent because of a greater control over viscosity during subsequent chain extension.

The addition of the chain extending agent, i.e. the mixture of components (A) and (B), preferably in the same inert organic solvent, then takes place with stirring at approximately room temperature or moderately elevated temperatures up to about 50° C. While the reaction with the chain extending agent takes place, the viscosity of the polyurethane product is carefully observed or regularly checked. When the desired viscosity is attained, the monohydric alcohol such as methanol or ethanol is added, preferably in an approximately equal volume of the inert solvent.

With the process of the invention, it is possible to set up predetermined viscosities in a broad range, e.g. from about 10 to 1000 poise as found to be useful in most technical applications. However, one can also achieve viscosities up to 2000 poise and beyond without difficulties. Most importantly, the viscosity of the solvent-soluble polyurethane can be much more easily set within narrow limits so as to achieve more uniform and predictable products when following the process of the invention, and the products themselves are more stable over a prolonged period of time.

The polyurethanes obtained according to the present invention can be processed in known manner into shaped or molded articles. Solutions of these polyurethanes in an inert organic solvent are suitable for dry or wet spinning into filaments or fibers as well as for the production of solidified films.

For example, by wet spinning the dissolved polyurethane into water at 80° C., highly elastic filaments or threads can be obtained. In addition to a high elasticity or elongation which can attain values of over 500%, such threads are distinguished by their good strength. The breaking length can amount to 6 km. and even more. Thread-adhering temperatures above 200° C. can be attained without any further treatment or special measures.

The invention permits one to achieve a wider variation but also a more carefully controlled uniformity in the properties of the polyurethanes produced thereby. It will be apparent that the known prepolymers and the conventional reaction conditions can be varied by one skilled in this art, depending upon the particular polyurethane being produced, and such variations are fully within the spirit and scope of the invention.

The following examples will more fully illustrate the invention and provide a detailed description of certain advantageous procedures and their products without limiting the invention to these examples.

EXAMPLE 1

300 grams (0.186 mol) of a water-free polyester of 1,4-butanediol and adipic acid (hydroxyl number=70, acid number=0.2) and 3.35 grams (0.037 mol) 1,4-butanediol are mixed at 60° C. with a solution of 111.5 grams (0.446 mol) of 4,4'-diphenylmethane-diisocyanate in 46 ml. toluene and kept at this same temperature for 30 minutes. The solution having a temperature of 60° C. is diluted with 730 ml. dimethyl formamide and then mixed at 40° C. with a solution of 4.96 grams (0.047 mol) of diethanol amine and 10.5 grams (0.142 mol) of 1,3-diaminopropane in 200 ml. dimethyl formamide. After 1.5 hours of stirring at 20° C., 50 ml. ethanol and 50 ml. dimethyl formamide are added. The clear solution then has a viscosity of 495 poise (at 20° C.) and after 48 hours it has a viscosity of 510 poise.

After evaporation of the solvent at an elevated temperature, the solution yields a clear, transparent, highly elastic film.

EXAMPLE 2

200 grams (0.1 mol) of a water-free polyester of ethylene glycol and adipic acid (hydroxyl number=56, acid number=0.3) and 161 grams (0.1 mol) of a water-free polyester of 1,4-butanediol and adipic acid (hydroxyl number=70, acid number=0.2) are mixed together with 100 grams (0.4 mol) 4,4'-diphenylmethane-diisocyanate at 90° C. and kept at this temperature for one hour. After then cooling to 75° C., the melt is dissolved in 910 ml. dimethyl formamide. One adds to the clear solution which has a temperature of 40° C., while stirring, a solution of 4.46 grams (0.042 mol) of diethanol amine and 7.66 grams (0.122 mol) of ethylene diamine in 200 ml. dimethyl formamide. The initially highly fluid, clear solution is stirred at 20° C. One hour and 50 minutes after the addition of the amine, 50 ml. ethanol and 50 ml. dimethyl formamide are added. The resulting cloudy solution then has a viscosity of 40 poise (at 20° C.); after two days, the viscosity is 43 poise; and after seven days the viscosity is 47 poise.

After the evaporation of the solvent at an elevated temperature, the solution yields a transparent, highly elastic film.

EXAMPLE 3

400 grams (0.2 mol) of a polyester of ethylene glycol and adipic acid (hydroxyl number=56, acid number=0.3) are mixed with 100 grams (0.4 mol) of 4,4'-diphenylmethane-diisocyanate at 95° C. and kept at this temperature for one hour. After cooling to 75° C., the melt is dissolved in 970 ml. dimethyl formamide. To the resulting clear solution with a temperature of 40° C., a solution of 7.15 grams (0.068 mol) of diethanol amine and 6.12 grams (0.102 mol) of ethylene diamine in 200 ml. dimethyl formamide are added while constantly stirring. The solution, which is initially highly fluid and clear, is stirred at 30° C. and it gradually becomes more viscous and cloudy. Seven hours after the addition of the amine, it is mixed with 50 ml. ethanol and 50 ml. dimethyl formamide. The solution then has a viscosity of 109 poise (at 20° C.); after 4 days it has a viscosity of 108 poise; after 11 days the viscosity is 107 poise; and after 13 days the viscosity is 108 poise.

After evaporation of the solvent at an elevated temperature, the solution yields a transparent, highly elastic film.

The following example describes the production of a polyurethane employing the same polyester and chain extending agents as in Example 3, except that the chain extending agents are used in a quantity which lies outside of the limits according to the invention.

EXAMPLE 4

400 grams (0.2 mol) of the polyester of ethylene glycol and adipic acid (hydroxyl number=56, acid number=0.3) are mixed with 100 grams (0.4 mol) 4,4'-diphenylmethane-diisocyanate at 95° C. and kept at this temperature for one hour. After cooling to 75° C., the melt is dissolved in 970 ml. dimethyl formamide. Stirring constantly, one adds to the resulting clear solution at a temperature of 40° C. a solution of 1.05 grams (0.01 mol) diethanol amine and 9.6 grams (0.16 mol) ethylene diamine in 200 ml. dimethyl formamide. The solution, which is initially highly fluid and clear, is stirred at 30° C., and it then becomes gradually more viscous and cloudy. Two hours and 25 minutes after the addition of the amine, 50 ml. ethanol and 50 ml. dimethyl formamide are added.

The viscosity increase can only be interrupted by the ethanol addition, and it cannot be stopped. After some time, the solution turns into a ropy substance the viscosity of which can no longer be measured. The resulting substance cannot be processed into a film by evaporation of the solvent.

The following three examples illustrate how one can achieve different viscosities and keep them constant or uniform simply by changing the point of time at which the alcohol is added, otherwise maintaining the same conditions in the preparation.

EXAMPLE 5

400 grams (0.2 mol) of a polyester of ethylene glycol and adipic acid (hydroxyl number=56, acid number=0.3) are mixed with 100 grams (0.4 mol) of 4,4'-diphenylmethane-diisocyanate at 95° C. and kept at the same temperature for one hour. After cooling to 75° C., the melt is dissolved in 970 ml. dimethyl formamide. While stirring, one adds to the clear solution having a temperature of 40° C. a solution of 4.46 grams (0.0425 mol) diethanol amine and 7.66 grams (0.128 mol) ethylene diamine in 200 ml. dimethyl formamide. The initially highly fluid, clear solution is stirred at 30° C. and it gradually becomes more viscous and cloudy. Four hours after the addition of the amine, 50 ml. ethanol and 50 ml. dimethyl formamide are added. The solution then has a viscosity of 138 poise (at 20° C.) after two days, it has a viscosity of 155 poise; after five days the viscosity is 160 poise.

After evaporation of the solvent at increased temperature, the solution yields a transparent, elastic film.

EXAMPLE 6

Example 5 is repeated except that the addition of 50 ml. ethanol and 50 ml. dimethyl formamide takes place five hours after the amine addition instead of 4 hours as in the preceding example. In this case, one obtains a solution having a viscosity which amounts to 255 poise (at 20° C.) and which remains practically constant for several days. After evaporation of the solvent at an elevated temperature, the solution yields a transparent, elastic film.

EXAMPLE 7

Example 5 is repeated except that the addition of 50 ml. ethanol and 50 ml. dimethyl formamide takes place six hours and 50 minutes after the amine addition. The solution then has a viscosity of 347 poise (at 20° C.); after three days, it has a viscosity of 380 poise; and after five days the viscosity is 395 poise. After evaporation of the solvent at an elevated temperature, the solution yields a transparent, elastic film.

EXAMPLE 8

400 grams (0.2 mol) of a polyester of ethylene glycol and adipic acid (hydroxyl number=56, acid number=0.3) are mixed with 100 grams (0.4 mol) of 4,4'-diphenylmethane-diisocyanate at 130° C. and kept at this temperature for 0.5 hour. The melt with a temperature of 130° C. is then dissolved in 975 ml. dimethyl formamide without previous cooling. To the resulting clear solution having a temperature of 50° C., one adds while stirring a solution of 4.46 grams (0.042 mol) of diethanol amine and 9.44 grams (0.127 mol) of 1,3-diaminopropane in 200 ml. dimethyl formamide. The solution, which is initially highly fluid, is stirred at 25° C. and it gradually becomes more viscous. Forty minutes after the addition of the amine, it is mixed with 50 ml. ethanol and 50 ml. dimethyl formamide. The clear solution then has a viscosity of 305 poise (at 20° C.); after 2 days, it has a viscosity of 290 poise.

After evaporation of the solvent at an elevated temperature, the solution yields a clear, highly elastic film.

EXAMPLE 9

400 grams (0.2 mol) of a polyester of ethylene glycol and adipic acid (hydroxyl number=56, acid number=0.3) are mixed with 100 grams (0.4 mol) of 4,4'-diphenylmethane-diisocyanate at 95° C. and kept at this temperature for 1 hour. After cooling to 75° C., the melt is dissolved in 975 ml. dimethyl formamide. To the resulting clear solution having a temperature of 40° C., one adds while stirring a solution of 3.94 grams (0.037 mol) diethanol amine and 8.33 grams (0.112 mol) 1,3-diaminopropane in 200 ml. dimethyl formamide. The initially highly fluid solution is stirred at 25° C., and it gradually becomes more viscous. Three hours after the amine addition, it is mixed with 50 ml. ethanol and 50 ml. dimethyl formamide. The clear solution then has a viscosity of 133 poise (at 20° C.); after four days, it has a viscosity of 123 poise; and after five days, the viscosity is 120 poise.

After evaporation of the solvent at an elevated temperature, the solution yields a clear, highly elastic film.

EXAMPLE 10

400 grams (0.3 mol) of a polyester of ethylene glycol and adipic acid (hydroxyl number=56, acid number=0.3) are mixed with 100 grams (0.4 mol) of 4,4'-diphenyl-methane-diisocyanate at 95° C., and kept at this temperature for one hour. After cooling to 75° C., the melt is dissolved in 975 ml. dimethyl formamide. To the resulting clear solution having a temperature of 40° C., one adds while stirring a solution of 4.46 grams (0.042 mol) diethanol amine and 9.44 grams (0.127 mol) 1,3-diaminopropane in 200 ml. dimethyl formamide. The initially highly fluid solution is stirred at 25° C., and it gradually becomes more viscous. Four hours after the amine addition, it is mixed with 50 ml. methanol and 50 ml. dimethyl formamide. The clear solution then has a viscosity of 141 poise (at 20° C.); after three days, it has a viscosity of 133 poise.

After evaporation of the solvent at an elevated temperature, the solution yields a clear, highly elastic film.

EXAMPLE 11

300 grams (0.357 mol) of polycaprolactone (hydroxyl number=133) are mixed at 80° C. with 179 grams (0.715 mol) of 4,4'-diphenylmethane-diisocyanate and kept at this temperature for 30 minutes. After cooling to 75° C., the melt is dissolved in 945 ml. dimethyl formamide. To the resulting clear solution having a temperature of 40° C., one adds while stirring a solution of 7.95 grams (0.0759 mol) diethanol amine and 16.85 grams (0.227 mol) 1,3-diaminopropane in 200 ml. dimethyl formamide. The initially highly fluid solution is stirred at 30° C., and it gradually becomes more viscous. Three and one-half hours after the addition of the amine, it is mixed with 50 ml. ethanol and 50 ml. dimethyl formamide. The clear solution then has a viscosity of 206 poise (at 20° C.); after two days, it has a viscosity of 210 poise.

After evaporation of the solvent, at increased temperature, the solution yields a clear, highly elastic film.

EXAMPLE 12

394 grams (0.2 mol) of polytetramethylene glycol (hydroxyl number=57) are mixed with 100 grams (0.4 mol) of 4,4'-diphenylmethane diisocyanate at 90° C. and kept at this temperature for two hours. After cooling to 75° C., the melt is dissolved in 945 ml. dimethyl formamide. To the resulting clear solution having a temperature of 25° C., a solution of 4.46 grams (0.042 mol) diethanol amine and 9.44 grams (0.127 mol) 1,3-diaminopropane in 200 ml. dimethyl formamide is added while stirring. The initially highly fluid solution is stirred at 25° C. and it gradually becomes more viscous. Four hours after the addition of the amine, it is mixed with 50 ml. ethanol and 50 ml. dimethyl formamide. The clear solution then has a viscosity of 144 poise (at 20° C.); after two days, it has a viscosity of 149 poise.

After evaporation of the solvent at an elevated temperature, the solution yields a clear, highly elastic film.

EXAMPLE 13

400 grams (0.2 mol) of a copolyester of ethylene glycol, 1,4-butane-diol and adipic acid (hydroxyl number=56, acid number=1) are mixed at 80° C. with 100 grams (0.4 mol) of 4,4'-diphenylmethane-diisocyanate and kept at this temperature for one hour. After cooling to 75° C., the melt is dissolved in 975 ml. dimethyl formamide. While stirring, one adds to the clear solution having a temperature of 37° C. a solution of 4.46 grams (0.042 mol) diethanol amine and 9.44 grams (0.127 mol) 1,3-diaminopropane in 200 ml. dimethyl formamide. The solution which is initially highly fluid is stirred at 25° C., and it gradually becomes more viscous. Five hours and 15 minutes after the addition of the amine, it is mixed with 50 ml. ethanol and 50 ml. dimethyl formamide. The clear solution than has a viscosity of 135 poise (at 20° C.); after eight days, it has a viscosity of 125 poise; after 12 days, the viscosity is 128 poise.

After evaporation of the solvent, the solution yields a clear, highly elastic film.

EXAMPLE 14

400 grams (0.182 mol) of a copolyester of 2,2-dimethylhexane-diol-(1,3), 1,6-hexane-diol and adipic acid (hydroxyl number=51, acid number=1.4), are mixed at 90° C. with 91 grams (0.364 mol) of 4,4'-diphenylmethane-diisocyanate and kept at this temperature for one hour. After cooling to 75° C., the melt is dissolved in 951 ml. dimethyl formamide. One adds to the resulting clear solution having a temperature of 38° C., while stirring, a solution of 4.07 grams (0.039 mol) diethanol amine and 8.6 grams (0.116 mol) 1,3-diaminopropane in 200 ml. dimethyl formamide. The initially thin solution is stirred at 25° C., and it gradually becomes more viscous. Six hours and 45 minutes after the addition of the amine, the solution is mixed with 50 ml. ethanol and 50 ml. dimethyl formamide. The clear solution then has a viscosity of 154 poise (at 20° C.); after five days, it has a viscosity of 143 poise; and after seven days, the viscosity is 141 poise.

After evaporation of the solvent at an elevated temperature, the solution yields a clear, highly elastic film.

EXAMPLE 15

300 grams (0.291 mol) of polytetramethylene glycol (hydroxyl number=109) are mixed at 90° C. with 25.3 grams (0.145 mol) of toluene-diisocyanate (80% of the 2,4-isomer and 20% of the 2,6-isomer) and kept at this temperature for one hour. Thereafter 72.6 grams (0.291 mol) of 4,4'-diphenylmethane-diisocyanate are added and the reaction mixture is again held at 90° C. for one hour. After cooling to 75° C., the melt is dissolved in 735 ml. dimethyl formamide. To the resulting clear solution having a temperature of 38° C., a solution of 3.26 grams (0.031 mol) diethanol amine and 6.88 grams (0.093 mol), 1,3-diaminopropane in 200 ml. dimethyl formamide is added. The solution, which is initially thin and highly fluid, is stirred at 25° C., and it then gradually becomes more viscous. Three hours and 20 minutes after the addition of the amine, the solution is mixed with 50 ml. ethanol and 50 ml. dimethyl formamide. The clear solution then has a viscosity of 165 poise (at 20° C.); after five days, it has a viscosity of 175 poise; after seven days, the viscosity is 185 poise.

After evaporation of the solvent, the solution yields a clear, highly elastic film.

EXAMPLE 16

300 grams (0.291 mol) of polytetramethylene glycol (hydroxyl number=109) are mixed at 90° C. with 109 grams (0.437 mol) of 4,4'-diphenylmethane-diisocyanate and kept at this temperature for one hour. After cooling to 75° C. the melt is dissolved in 760 ml. dimethyl formamide. To the resulting clear solution having a temperature of 40° C., one adds while stirring a solution of 3.26 grams (0.031 mol) diethanol amine and 5.58 grams (0.093 mol) ethylene diamine in 200 ml. dimethyl formamide. The solution which is initially highly fluid is stirred at 25° C., and it then gradually becomes more viscous. One hour and 45 minutes after the amine addition, the solution is mixed with 50 ml. dimethyl formamide and 50 ml. ethanol. The clear solution then has a viscosity of 205 poise (at 20° C.); after two days, it has a viscosity of 215 poise; and after six days, the viscosity is 235 poise.

After evaporation of the solvent at an elevated temperature, the solution yields a clear, highly elastic film.

EXAMPLE 17

400 grams (0.2 mol) of a polyester of ethylene glycol and adipic acid (hydroxyl number=56, acid number =0.3) are mixed at 95° C. with 100 grams (0.4 mol) of 4,4'-diphenylmethane-diisocyanate and kept at this same temperature for one hour. After cooling to 75° C., the melt is dissolved in 970 ml. dimethyl formamide. To the resulting clear solution having a temperature of 40° C., one adds while stirring a solution of 4.46 grams (0.0425 mol) diethanol amine and 20.2 grams (0.127) mol) of an isomer mixture of 2,2,4- and 2,4,4-trimethylhexamethylene diamine (approximately 1:1 ratio of isomers) in 200 ml. dimethyl formamide. The solution which is initially highly fluid and clear is stirred at 30° C. It then gradually becomes more viscous, and four hours and 15 minutes after the amine addition, it is mixed with 50 ml. ethanol and 50 ml. dimethyl formamide. The solution then has a viscosity of 240 poise (at 20° C.); after two days, it has a viscosity of 218 poise; and after six days, the viscosity is 203 poise.

After evaporation of the solvent at an elevated temperature, the solution yields a transparent, highly elastic film.

EXAMPLE 18

400 grams (0.2 mol) of a polyester of ethylene glycol and adipic acid (hydroxyl number=56, acid number =0.3) are mixed at 95° C. with 100 grams (0.4 mol) of 4,4'-diphenylmethane-diisocyanate and kept at this same temperature for one hour. After cooling to 75° C., the melt is dissolved in 970 ml. dimethyl formamide. To the resulting clear solution having a temperature of 40° C., one adds while stirring a solution of 4.46 grams (0.0426 mol) diethanol amine and 21.7 grams (0.127 mol) 1-amino-3-aminomethyl-3,5,5-trimethyl-cyclohexane in 200 ml. dimethyl formamide. The initially highly fluid, clear solution is stirred at 30° C. It then gradually becomes more viscous, and four hours and 40 minutes after the addition of the amine, it is mixed with 50 ml. ethanol and 50 ml. dimethyl formamide. The solution then has a viscosity of 195 poise (at 20° C.); after two days, it has a viscosity of 178 poise; and after six days, the viscosity is 168 poise.

After evaporation of the solvent at an elevated temperature, the solution yields a transparent, elastic film.

EXAMPLE 19

400 grams (0.2 mol) of a polyester of ethylene glycol and adipic acid (hydroxyl number=56, acid number =0.3) are mixed at 95° C. with 100 grams (0.4 mol) of 4,4'-diphenylmethane-diisocyanate and kept at this same temperature for one hour. After cooling to 75° C., the melt is dissolved in 970 ml. dimethyl formamide. To the resulting clear solution having a temperature of 40° C., a solution of 3.57 grams (0.034 mol) diethanol amine and 8.15 grams (0.136 mol) ethylene diamine in 200 ml. dimethyl formamide is added while stirring. The initially thin, clear solution is stirred at 30° C. and it gradually becomes more viscous and cloudy. Five hours after the addition of the amine, 50 ml. ethanol and 50 ml. dimethyl formamide are added. The solution then has a viscosity of 360 poise (at 20° C.); after three days, it has a viscosity of 385 poise; and after five days, the viscosity is 390 poise.

After evaporation of the solvent at an elevated temperature, the solution yields a transparent, elastic film.

EXAMPLE 20

400 grams (0.02 mol) of a polyester of ethylene glycol and adipic acid (hydroxyl number=56, acid number =0.3) are mixed at 95° C. with 100 grams (0.4 mol) of 4,4'-diphenylmethane-diisocyanate and kept at this same temperature for one hour. After cooling to 75° C., the melt is dissolved in 970 ml. dimethyl formamide. To the resulting clear solution having a temperature of 40° C., a solution of 10.7 grams (0.102 mol) diethanol amine and 4.08 grams (0.068 mol) ethylene diamine in 200 ml. dimethyl formamide is added while stirring. The initially highly fluid solution is stirred at 30° C. and gradually becomes more viscous and cloudy. Four hours and 28 minutes after the addition of the amine, 50 ml. ethanol and 50 ml. dimethyl formamide are added. The solution then has a viscosity of 204 poise (at 20° C.); after three days, it has a viscosity of 170 poise; and after four days, it has a viscosity of 161 poise.

After evaporation of the solvent at an elevated temperature, the solution yields a transparent, elastic film.

EXAMPLE 21

300 grams (0.286 mol) of a polyester of 1,4-butanediol and adipic acid (hydroxyl number=107, acid number =0.4) are mixed and maintained for one hour at 90° C. with a solution of 119.2 grams (0.477 mol) 4,4'-diphenylmethane-diisocyanate in 50 ml. toluene. After cooling to 75° C., the solution is diluted with 730 ml. dimethyl formamide. To the resulting clear solution having a temperature of 25° C., a solution of 5.42 grams (0.0407 mol) diisopropanol amine and 7.34 grams (0.122 mol) ethylene diamine in 200 ml. dimethyl formamide is added while stirring. The solution which is initially highly fluid and clear is stirred at 25° C., and it gradually becomes more viscous and cloudy. Five hours and 20 minutes after the amine addition, 50 ml. ethanol and 50 ml. dimethyl formamide are added. The solution then has a viscosity of 163 poise (at 20° C.), and this viscosity remains practically constant over a prolonged period of time.

After evaporation of the solvent at an elevated temperature, the solution yields a transparent, elastic film.

Example 22

400 grams (0.2 mol) of a polyester of ethylene glycol and adipic acid (hydroxyl number=56, acid number= 0.3) are mixed at 95° C. with 100 grams (0.4 mol) of 4,4-diphenylmethane-diisocyanate and kept at this same temperature for one hour. After cooling to 75° C., the melt is dissolved in 975 ml. dimethyl formamide. To the resulting clear solution having a temperature of 40° C., a solution of 4.98 grams (0.0474 mol) diethanol amine and 10.55 grams (0.142 mol) 1,3-diaminopropane in 200 ml. dimethyl formamide are added while stirring. The solution which is initially thin and fluid is stirred at 25° C. The solution then gradually becomes more viscous, and five hours and 10 minutes after the addition of the amine, it is mixed with 50 ml. ethanol and 50 ml. dimethyl formamide. The clear solution then has a viscosity of 56 poise (at 20° C.); after four days, it has a viscosity of 67 poise; and after five days the viscosity is 71 poise.

After evaporation of the solvent at an elevated temperature, the solution yields a transparent, elastic film.

The invention is hereby claimed as follows:

1. In a process for the production of a substantially linear polyurethane wherein a prepolymer having terminal isocyanate groups and formed by reacting (1) an aromatic diisocyanate with
(2) a substantially linear macrodiol having a molecular weight of about 500 to 6,000 and from 0 to 50 mol percent, with reference to the total mols of diol, of a lower molecular weight aliphatic diol, is subjected to a chain extending reaction with increasing viscosity by the addition of a chain extending agent, the improvement in the control and uniformity of the viscosity of the linear polyurethane which comprises:
adding to the prepolymer as the chain extending agent a mixture of
(A) 0.15 to 0.85 mols per mol of prepolymer of at least one difunctional chain extender selected from the class consisting of diamines, hydrazine and hydrazides, and (B) 0.1 to 0.8 mols per mol of prepolymer of a dihydroxy aliphatic monoamine, with the proviso that the sum of the mols of the components (A) and (B) is less than the total mols of said prepolymer; and stopping the chain extending reaction by the addition of a monohydric alcohol when attaining a desired viscosity.

2. A process as claimed in claim 1 wherein at least 0.3 mols of (A)+(B) are added per mol of said prepolymer.

3. A process as claimed in claim 2 wherein the molar ratio of (A):(B) is about 10:1 to 1:2.

4. A process as claimed in claim 1 wherein about 0.75 to 0.95 mol of (A)+(B) are added per mol of said prepolymer.

5. A process as claimed in claim 4 wherein the molar ratio of (A):(B) is about 8:1 to 3:1.

6. A process as claimed in claim 5 wherein component (B) is diethanol amine.

7. A process as claimed in claim 6 wherein component (A) is ethylene diamine.

8. A process as claimed in claim 6 wherein component (A) is 1,3-diaminopropane.

9. A process as claimed in claim 5 wherein component (A) is ethylene diamine.

10. A process as claimed in claim 9 wherein component (B) is diisopropanol amine.

11. A process as claimed in claim 1 wherein said macrodiol has a molecular weight of approximately 800 to 2,500.

12. A process as claimed in claim 1 wherein said lower molecular weight aliphatic diol is 1,4-butanediol and is employed together with said macrodiol in an amount up to 50 mol percent with reference to the total mols of diol in the formation of said prepolymer.

13. A process as claimed in claim 1 wherein said chain extending reaction is caried out at a temperature of about 20° C. to 50° C.

14. A process as claimed in claim 13 wherein said monohydric alcohol used for stopping the chain extending reaction is methanol.

15. A process as claimed in claim 13 wherein said monohydric alcohol used for stopping the chain extending reaction is ethanol.

16. A process as claimed in claim 1 wherein said macrodiol is a linear hydroxy-terminated polyester of a lower alkylene glycol of 2 to 8 carbon atoms and adipic acid and said aromatic diisocyanate is 4,4'-diphenylmethane diisocyanate.

17. A process as claimed in claim 1 wherein said macrodiol is polytetramethylene glycol and said aromatic diisocyanate is 4,4'-diphenylmethane diisocyanate.

References Cited

UNITED STATES PATENTS

| | | | |
|---|---|---|---|
| 2,621,166 | 12/1952 | Schmidt et al. | 260—75 |
| 2,929,800 | 3/1960 | Hill | 260—77.5 |
| 2,933,477 | 4/1960 | Hostettler | 260—77.5 |
| 3,044,987 | 8/1962 | Schaefgen et al. | 260—75 |
| 3,198,578 | 6/1965 | Kuemmerer | 260—77.5 |
| 3,305,533 | 2/1967 | Thoma et al. | 260—75 |
| 3,384,624 | 5/1968 | Heiss | 260—77.5 |
| 3,401,133 | 9/1968 | Grace et al. | 260—29.2 |

FOREIGN PATENTS

| | | |
|---|---|---|
| 1,005,047 | 9/1965 | Great Britain. |
| 1,344,657 | 10/1963 | France. |

DONALD E. CZAJA, Primary Examiner

H. S. COCKERAM, Assistant Examiner

U.S. Cl. X.R.

260—77.5

PO-1050
(5/69)

UNITED STATES PATENT OFFICE
CERTIFICATE OF CORRECTION

Patent No. 3,483,167                    Dated December 9, 1969

Inventor(s)   Erwin Sommer et al

It is certified that error appears in the above-identified patent and that said Letters Patent are hereby corrected as shown below:

Column 1, line 48, "speciflc" should read --specific--.

In the references:
        "3,198,578" should read "3,189,578".

SIGNED AND
SEALED
JUN 2 1970

(SEAL)
Attest:

Edward M. Fletcher, Jr.                    WILLIAM E. SCHUYLER, JR.
Attesting Officer                          Commissioner of Patents